July 5, 1966  A. LODIGE  3,258,885
CONVEYOR SHAFTS WITH CONVEYING DEVICES
Filed Jan. 7, 1963  2 Sheets-Sheet 2
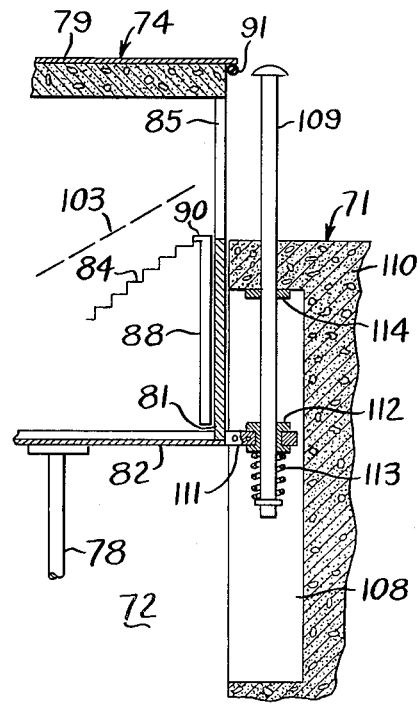
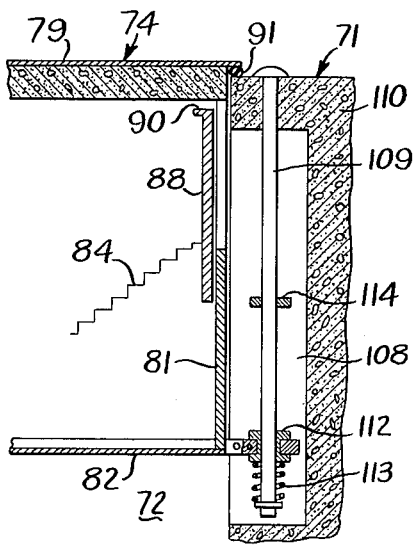
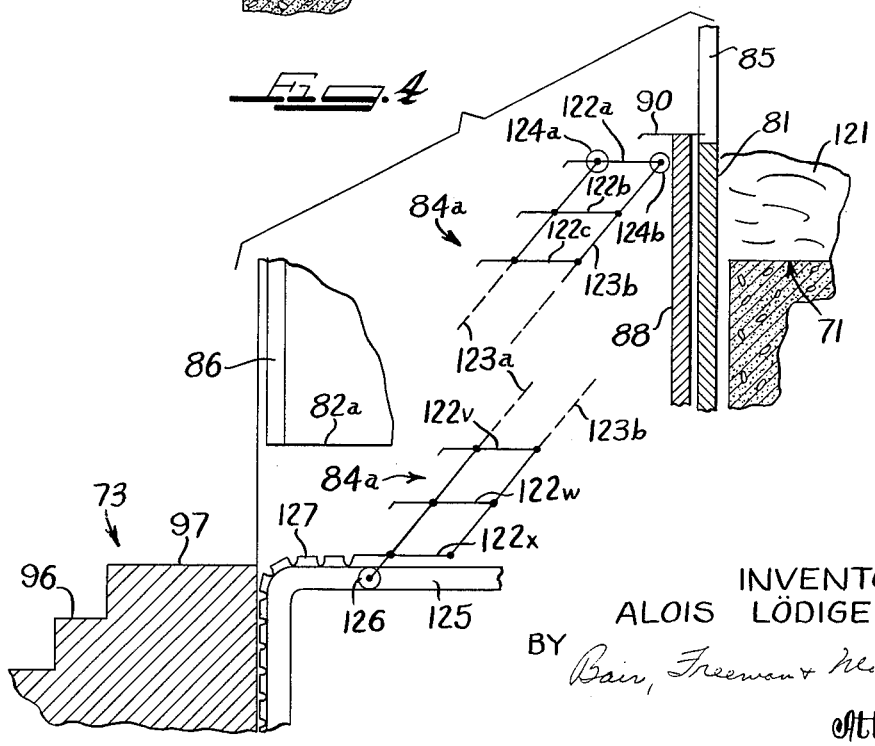
INVENTOR
ALOIS LÖDIGE
BY Bair, Freeman & Molinare
Attys.

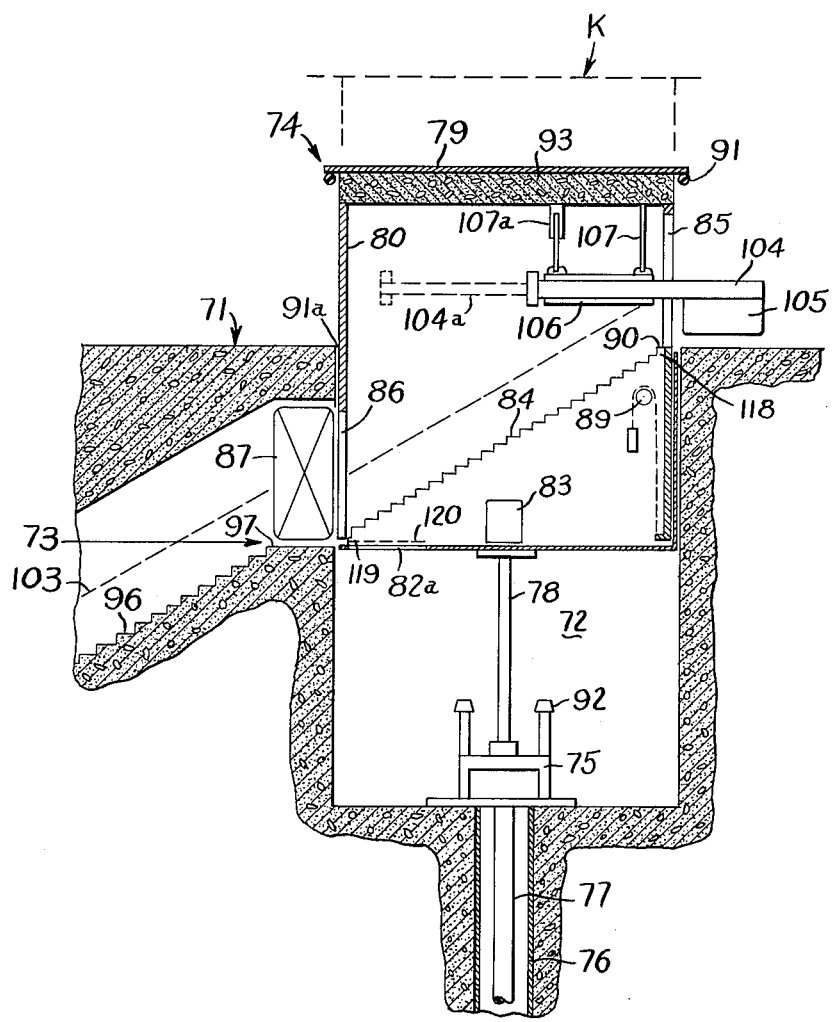

3,258,885
CONVEYOR SHAFTS WITH CONVEYING
DEVICES
Alois Lodige, Frankfurter Weg 13, Paderborn, Germany
Filed Jan. 7, 1963, Ser. No. 249,911
Claims priority, application Germany, Jan. 8, 1962,
L 38,972; May 15, 1962, L 40,873
4 Claims. (Cl. 52—64)

This invention relates to a conveyor shaft with conveyor devices. Such a conveyor shaft is generally employed for inter-connecting a plurality of conveyor ways or paths which are displaced with relation to each other.

An application of the invention is to be the entrances to subterranean shelters or to only intermittently employed entrances to subterranean means of communication or to similar installations. In such cases there is again employed a movable shaft part in the form of a hood, a plurality of doors at different heights being provided in this hood between which is arranged a traversable connecting way. Also in this example of the application of the invention the hood covers the shaft, when in its rest position, in line with the level of the floor. In this application also, moreover, provision may be made for the uppermost of the doors provided in the hood to be brought, at will, above the floor level (which is important, for example, where entrances to underground shelters are concerned in case there should be a heap or rubble), the more than normal projection of the hood being suited either by making the conecting way between a sub-floor level and the upper door in the hood adjustable in length or by making the connecting way from the sub-floor level accessible at will through any of a number of superposed doors.

FIGURE 1 is a diagrammatic vertical section of a lowerable shaft part constructed as a hood and having a staircase for intermittent or occasional personal traffic between the floor level and an under-floor level;

FIGS. 2 and 3 show a modification of the hood entrance shown in FIG. 1, in two different positions;

FIG. 4 is a fragmentary diagrammatic view of a modified construction of the staircase employed in FIG. 1.

The embodiment of the invention shown in FIG. 1 is advantageously designed for use as the entrance and exit for a subterranean shelter. It may, however, also be converted for other uses, for example, as an auxiliary entrance and exit for underground means of communication, upon the making of only unimportant changes. It in effect provides a telescopic shaft which enables the stationary shaft to be prolongated.

As can be seen in FIG. 1, a shaft 72 extends downwards from the floor level 71. In the side wall of the shaft 72 is provided an opening which leads to the sub-floor level 73 that is to be connected occasionally with the floor level 71. A lowerable hood 74 is slidable vertically in the shaft 72 along usual guides which are not shown in FIG. 1 for reasons of clarity. The upward and downward movements of the hood 74 may be produced by driving means or elevator mechanisms such as are generally used or applicable in under-floor hoists or lifts. A hydraulic drive has however shown itself to be very suitable, especially in the application of the invention to shelter entrances. Such a hydraulic drive can be seen in FIG. 1 where 75 is a hydraulic aggregate, 76 is an end-tube set in the bottom of the shaft 72, 77 is a cylinder disposed in the tube 76 and 78 is a piston rod or ram engaging the hood 74.

The hood 74 consists of a cover plate 79 and side walls shown in section at 80 and 81. The lower closure of the hood is formed by a bottom plate 82 which is, however, removable, and even in the case of certain variants of the invention to be described below, may actually be omitted. The forces exerted upon the hood by the driving means are taken up by a transverse bearer 83 (e.g. a box girder) anchored in the side walls of the hood. The cross-sectional shape of the shaft 72 is immaterial. The shaft may be made of circular, rectangular, square or any other cross-sectional shape to suit the special requirements of the situation. The hood 74 is naturally adapted in shape to suit whatever may be the cross-sectional shape of the shaft 72.

FIG. 1 shows the hood 74 in the projected position and it will be seen that two openings 85 and 86, which are formed in the side-wall parts 81 and 80 of the hood, are then disposed immediately above the upper floor level 71 and the sub-floor level 73, respectively. It will be seen, also, that a staircase extends between the two openings 85 and 86, within the hood, and thus constitutes a traversable connecting path between the upper floor level 71 and the sub-floor level 73. The openings 85 and 86 are closable by means of hoist doors. For the opening 86 leading to the sub-floor level 73 there is provided a normal hoist door 87 (operating in accordance with the appropriate regulations) which is suitably mounted in the side wall of the shaft 72. The upper door, which is associated with the opening 85 leading to the floor level 71, must be connected to the hood and lowerable together with this, as there is a requirement that the floor level 71 shall not exhibit any projecting structures when the hood is in its retracted position. In the representation of FIG. 1 the door associated with the opening 85 is shown as a vertically slidable door 88. The actuation of the door 88 is effected by means of a closing mechanism 89 which acts, for example, through a rope upon the door 88. Naturally, other known methods may be employed for the actuation of the sliding door 88. The upper edge 90 of the door 88 constitutes the uppermost tread of the staircase 84 when the door is in its lowered position. Other constructional forms of the door associated with the opening 85 will be described below.

In the lowered position of the hood the cover plate 79 of the latter, which plate extends somewhat at all edges beyond the mouth of the shaft 72, rests upon the floor level 71. It may be sealed in a gas- and water-tight manner without difficulty by means of packings 91 arranged beneath the projecting margins of the cover plate 79 and engaging the correspondingly formed upper edge 91a of the shaft at the floor level 71. Elastic buffers 92 may be arranged above the hydraulic gear 75 to be contacted by the hood 74 when it reaches its lowered position.

The arrangement is so designed that the hoist regulations prescribed by stringent legal and governmental requirements may be adhered to. This means that the hood 74 can only be lowered after the doors 87 and 88 have been closed. Further, it means that the displacement of the hood upwards can only be effected by controlling the same from the floor level 71. It could be, however, that in the special case of the application of the invention to shelter entrances, some unforeseen catastrophe would necessitate a departure from these regulations which are not themselves dictated by technical circumstances. In the application of the invention to underground shelters it could happen that due to destruction which had arisen in the region of the floor level 71, it would be impossible to control the movement of the hood 74 from the floor level. It could further happen that due to the catastrophe which had arisen, wreckage and rubble had collected over the cover plate 79 of the lowered hood 74. Provision is therefore made, especially in the case of underground shelters, whereby the raising of the hood 74 shall be controllable from the region of the sub-floor level 73 or from the bottom of the shaft 72, which is accessible through suitable doors (not shown). Furthermore, the driving gear (hydraulic gear 75) for effecting the raising of the hood, the connecting means between the driving gear and the hood (especially the piston rod or ram 78 and the transverse bearer 83), the side walls of the hood and the cover plate 79 of the latter are all made so strong and/or powerful that the hood may be raised even though there is a pile of rubble over the retracted hood. The special dimensioning of the different parts just mentioned will depend on the given characteristics, such, for example, as the cross-section of the shaft 72 and, correspondingly, the area of the cover plate 79, the prescribed height of projection of the hood 74 and/or the quantity and character of the maximum amount of rubble to be expected (thus, for example, on the fact whether the shelter entrance is located in open country or in the centre of a built-up area).

If the invention is to be applied to underground shelters, certain further special provisions are made which are indicated diagrammatically in FIG. 1. Thus provision must be made for the effective protection of the inmates of the shelter against the explosive, fire and radiation processes which may be occurring in the region of the floor level. For this purpose there is disposed beneath the cover plate 79 of the hood a further covering layer 93 of a mechanically resistant material provided with radiation protection such, for example, as radiation-protective concrete. It is furthermore suitable to arrange the actual shelter deeper than the sub-floor level 73 in order to have the possibility of arriving at a correspondingly stable construction of the roof of the shelter, since the difference in height between the floor level 71 and the sub-floor level 73 cannot be as great as desired in view of the size of the hood 74 and the length and steepness of the staircase 84. For this purpose, a further fixed staircase 96 is provided between the sub-floor level 73 and the actual floor of the shelter. The top step 97 of this fixed staircase may then, in order to afford a good transition to the staircase 84, be constructed as an extended landing (not shown in FIG. 1). Naturally, the necessity for arranging a fixed staircase 96 leading to a floor disposed below the sub-floor level 73 may arise in numerous other applications of the invention and it need not arise necessarily only in the case of underground shelters.

A special problem always arises in those cases where many people must be hurried through an entrance opening in a comparatively short space of time; the question of avoiding jams. This problem is particularly important in the case of underground shelters as the people who throng into the shelter in case of danger frequently show panic instead of normal reactions. In order to avoid jams in front of the upper entrance opening 85, guides are provided which, in advance of the actual entrance opening, subdivide the total width of the latter into a series of narrow single paths all traversable by individuals only one after the other and never side-by-side. These single paths may be continued over the region of the staircases 84 and 96 by means of railings or the like which are indicated diagrammatically at 103. The said guides, which naturally may not project above the upper floor level 71 in the lowered position of the hood, may take many different forms. In the illustration of FIG. 1, a row of push-rods 104 are provided side-by-side to carry on their front ends balustrade flaps 105 and these rods are displaceably arranged in the interior of the hood 74 in such a manner that when the hood has been raised and the upper access door has been opened, the rods may be pushed outwards. The push-rods 104 may, for example, be mounted in guide elements 106 which are connected by way of struts 107 either with the cover plate 79 or with the cover layer 93 of the hood. The guide elements 106 are suitably arranged so that the push-rods may still be pushed back even when slightly tilted or bent, so that also in this case the withdrawal of the rods 104 and the lowering of the hood 74 will not be impeded. The actuation of the push-rods may be effected hydraulically, manually or by other means. The broken line 104a in FIG. 1 indicates the position of the rear portions of the push-rods 104 in the retracted position. The struts 107 (or at least one of the struts 107a) may be adjustable in length and pivotally connected to the guide 106 in order to permit the guide to swing out of the vertical plane.

Some further ways of avoiding jams in front of the entrance opening 85 are shown diagrammatically in FIGS. 2 and 3. In this example, an auxiliary shaft 108 is provided alongside the shaft 72 and a lowerable post 109 is movable up and down within the auxiliary shaft. This post is carried up through an aperture in the upper covering 110 of the auxiliary shaft 108 to the floor level 71. At its lower end the post 109 is connected to the side wall or the bottom plate of the hood 74 by means of a strut 111 which has a weakened zone so that it will fracture under a predetermined excessive stress as a safety measure. Thus, should the post 109 jam for any reason, the connection between the post and the hood will be broken and the hood may be moved. This possibility is particularly important in the lowering of the hood in emergencies. As the height of the hood 74, when it is in its lowered position, may vary somewhat on account of the elastic construction of the packing 91 and the buffer 92, the connection of the post 109 to the hood 74 is suitably also made elastic. As can be seen from FIG. 2, the strut 111 carries a guide block 112 in which the post 109 may slide. Between the block 112 and the lower end of the post 109 is provided a spiral spring 113 which (see FIG. 3) becomes somewhat compressed in the lowered position of the hood 74 after the head of the post has come to bear upon the floor level. An abutment 114 may be provided on the post 109 which will come to bear against the underside of the covering 110 of the auxiliary shaft during the raising of the hood and post, there possibly being a slight extension of the spring 113 during the raising movement. Instead of the rigid securing of the post 109 to the hood 74, with the frangible safety device, any other connection may be provided which will cause a movement of the post 109 together with the hood 74 but will disconnect the post and hood as soon as the movement of the hood 74 is hindered to more than a predetermined degree by any disturbances which act on the displaceability of the post, so that the post 109 then no longer follows the movements of the hood 74.

In the application of the invention to underground shelters it may happen, as already mentioned, that rubble collects on the floor level 71. If now in such a case the hood 74 is raised to the height corresponding to the floor level 71 (see FIG. 1) in the manner already described, the rubble on the cover plate 79 being lifted and pushed aside, the door to the opening 85 would have to open at such a height that its opening, in some circumstances, would be largely prevented by rubble. For such a case the hood is suitably projected to a greater height (for example, to the position shown in broken lines at K in FIG. 1) and thus rises above the higher level of the floor 71 produced by the rubble. On the other hand, the sub-floor level 73 remains stationary so that, in order to meet this problem, the staircase 84 is suitably so designed that its lower end cannot be raised above the sub-floor level 73 whereas its upper end follows the lower edge of the opening 85 to above the upper floor level 71. Naturally, with such an additional projection of the hood 74, the lower edge of the opening 86 moves above the sub-floor level 73 so that the bottom plate 82 of the hood 74 may conveniently be omitted, in this case, or at least must exhibit in the neighborhood of the lower end of the staircase 84 an opening 82a which permits of holding the lower end of the staircase 84 at the height of the sub-floor level 73 while the hood is raised still higher. It will be appreciated that in such a case the staircase 84 may not be completely rigid (e.g. treads welded to the side walls of the hood) but must be arranged to be movable relative to the hood.

In the simplest case, the arrangement is such that a staircase 84, which itself is rigid, is pivotally mounted at its upper end in a bearing 118 in the hood 74. The lower end of the staircase is normally locked to the hood 74 by means of a bolt 119. As soon, however, as the hood 74 is to be raised to a greater than normal extent, the lower end of the staircase is unlocked from the hood and instead is locked to the side wall of the shaft 72. The locking means mentioned may comprise locking bolts which are actuated by hand or hydraulically. As upon the greater than normal upward movement of the hood 74 the lower end of the staircase 84 must execute a movement inwardly of the hood away from the tread 97 which constitutes the terminal edge of the floor level 73 at the shaft 72, the locking means 119 is so arranged that it is displaceable along its sliding track 120 (shown diagrammatically in FIG. 1) in the side wall of the shaft 72, parallel to the sub-floor level 73. The gap which arises between the lowermost tread of the staircase 84 and the fixed tread 97, due to the displacement of the lower end of the staircase along the track 120 during the greater than normal lift of the hood 74, may, in the simplest case, be covered by plates which, for example, are lockable in the neighborhood of the track 120 or at separate places in the side wall of the shaft 72.

The displacement of the locking means 119, connecting the lower end of the staircase 84 to the wall of the shaft 72, along the track 120 and the use of cover plates thereby entailed may be dispensed with if the staircase, instead of being rigid, is constructed to be variable in length of the staircase but on the other hand, besides the tongs framework. With such a variable length staircase the height of the risers naturally varies with the total length of the staircase but on the other hand, beside the advantages already mentioned, there is the further advantage that the individual stair-treads remain horizontal and do not assume a downward inclination, as happens in the simplest case described above, which would make the traversing of the steps difficult. Instead of a variable-length concertina stairway there may be employed a variable-length inclined footway consisting of two mutually displaceable parts.

An alternative way of making the hood capable of greater than normal movement above the floor level 71 although the sub-floor level 73 is stationary will be described with reference to the diagram of FIG. 4. Similar parts are indicated by the same reference numerals. In the example of FIG. 4 use is made of a parallelogram stairway 84a which is constructed from separate struts articulated together to form parallelogram-type frames the horizontally extending struts 122a to 122x of which are constructed as plates or are connected to plates and form the individual stair-treads whereas the inclined struts 123a, 123b constitute side-cheeks to the stairway. The uppermost tread 122a of the stairway 84a is rigidly connected to the side walls of the hood so that the articulation points 124a and 124b are the pivot points for the struts 123a, 123b. The struts 123a are extended beyond the lowest tread 122x and each is supported in a guide rail 125 (mounted in one of the side walls of the shaft 72) by means of a suitably constructed guide element 126. The rail 125 extends below the sub-floor level 73 vertically along the wall of the shaft 72 and at such a position in relation to the stair-tread 97 that the lowermost tread 122x of the stairway 84a can slide past but close to the edge of the tread 97 when the hood 74 is lowered. At the height of the sub-floor level 73 the guide rail 125 is bent through a right angle inwards, i.e. away from the tread 97.

It will be seen from FIG. 4 that during a normal raising of the hood 74 only the vertical portion of the guide rail 125 will be traversed so that the stairway 84a functions in the same manner as the staircase 84 when this is locked to the hood 74 as described with reference to FIG. 1. However, as soon as the hood has to be raised above the normal height by reason of a heap of rubble 121 accumulated above the floor level 71, the guide element 126 moves into the horizontally disposed portion of the guide rail 125. The stairway becomes steeper and this spans a greater difference in levels, in this case the difference between the sub-floor level 73 and the upper edge of the heap of rubble 121. The treads 122a to 122x of the stairway 84a remain in their horizontal positions by reason of the parallelogram linkage construction adopted. As a gap forms between the lowest tread 112x of the stairway 84a and the tread 97 as the guide element 126 moves along the horizontal portion of the rail 125, means must also be provided in the arrangement of FIG. 4 for covering this gap. The plates already mentioned in the foregoing description may also be used here but it is also possible, however, to connect to the lowest tread 122x, or to the guide element 126, a covering 127 (of Venetian blind or roller-shutter type) which is movable with the stairway 84a and thus automatically covers any gap arising between the treads 97 and 122x. The covering 127 may slide in the guide rail 125 or upon this rail (as shown diagrammatically in FIG. 4) or even in a separate guide rail.

I claim:

1. A telescopic shaft for interconnecting a sub-floor level with a floor level, said telescopic shaft comprising a fixed shaft, a vertically movable elevator mechanism disposed in said fixed shaft, a movable shaft constructed as a hood and adapted to be raised and lowered by the elevator mechanism, said hood being engaged by said elevator mechanism, said hood including a cover plate and side walls, said cover plate being substantially flush with the floor level in the lower position of the hood, entrance openings at different heights provided in the side walls of the hood, doors for said openings, one of said openings being positioned at or below the floor level, another of said openings being positioned at or below the sub-floor level, and an inclined ramp within the confines of the hood extending between and leading directly to and from said doors and constituting a traversable connecting path between the sub-floor level and the floor level in the raised position of the hood, said side walls and cover plate of the hood and one of said doors operating to close off the sub-floor level when the hood is moved to its lower position to provide a double closure for said sub-floor level.

2. The telescopic shaft construction claimed in claim 1 wherein the door for the opening positioned at, or below the floor level is a vertically moving door attached to the hood.

3. The telescopic shaft construction set forth in claim 1 including means provided in the entrance opening in the hood leading to the floor level for sub-dividing that opening into several paths each traversable by persons in single file only.

4. The telescopic shaft construction set forth in claim 3 wherein said means for dividing the entrance openings comprising posts, an auxiliary shaft for normally containing said posts, said auxiliary shaft being arranged alongside the fixed shaft for the hood, and said posts being projectable out of the auxiliary shaft as the hood is raised.

References Cited by the Examiner

UNITED STATES PATENTS

| | | | |
|---|---|---|---|
| 592,190 | 10/1897 | Bond | 187—1 |
| 763,782 | 6/1904 | Oschger | 187—17 |
| 773,478 | 10/1904 | Conner et al. | 187—17 |
| 1,178,814 | 4/1916 | Mau et al. | 187—62 |
| 1,199,174 | 9/1916 | Gumpel | 187—1 |
| 1,986,712 | 1/1935 | Clark. | |
| 2,189,486 | 2/1940 | D'Amico. | |
| 2,487,613 | 11/1949 | Stone. | |
| 2,792,794 | 5/1957 | Miller. | |
| 2,827,983 | 3/1958 | Lowe | 187—61 |
| 2,977,723 | 4/1961 | Rudinger. | |
| 3,159,093 | 12/1964 | Rosenfeld. | |

LOUIS J. DEMBO, *Primary Examiner.*

SAMUEL F. COLEMAN, *Examiner.*

C. DUFFIELD, *Assistant Examiner.*